US009977835B2

(12) United States Patent
Schechter et al.

(10) Patent No.: US 9,977,835 B2
(45) Date of Patent: *May 22, 2018

(54) QUERYLESS SEARCH BASED ON CONTEXT

(71) Applicant: MICROSOFT TECHNOLOGY LICENSING, LLC, Redmond, WA (US)

(72) Inventors: Michael Austin Schechter, Sammamish, WA (US); Nipoon Malhotra, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/266,396

(22) Filed: Sep. 15, 2016

(65) Prior Publication Data

US 2017/0068739 A1 Mar. 9, 2017

Related U.S. Application Data

(63) Continuation of application No. 13/718,202, filed on Dec. 18, 2012, now Pat. No. 9,483,518.

(51) Int. Cl.
*G06F 17/30* (2006.01)
(52) U.S. Cl.
CPC .. *G06F 17/30867* (2013.01); *G06F 17/30386* (2013.01); *G06F 17/30528* (2013.01)
(58) Field of Classification Search
CPC ......... G06F 17/30386; G06F 17/30867; G06F 17/30; G06F 17/30387; G06F 17/30967;
(Continued)

(56) References Cited

U.S. PATENT DOCUMENTS 7,603,349 B1 * 10/2009 Kraft ................. G06F 17/30867
707/E17.067
7,672,543 B2 3/2010 Hull et al.
(Continued)

FOREIGN PATENT DOCUMENTS

CN 102395966 A 3/2012
WO 2012142323 A1 10/2012

OTHER PUBLICATIONS

International Preliminary Report on Patentability for PCT Application No. PCT/US2013/075625, dated Mar. 24, 2015, Filed Date: Dec. 17, 2013, 18 Pages.
(Continued)

*Primary Examiner* — Anh Ly
(74) *Attorney, Agent, or Firm* — Shook, Hardy & Bacon L.L.P.

(57) ABSTRACT

Computer-readable media, computer systems, and computing devices for initiating a queryless search is provided. In this regard, a search can be initiated without a user inputting a query. In one embodiment, the method includes recognizing a search indication provided by a user to indicate a desire to view one or more search results related to content being presented. Such a search indication can be performed without accessing a web page associated with a search engine. In accordance with the search indication, contextual information related to the content being presented can be automatically captured. Thereafter, the captured contextual information is provided to initiate a search for information corresponding with the contextual information. Search results corresponding with the contextual information are received and presented.

19 Claims, 11 Drawing Sheets

(58) Field of Classification Search
CPC .............. G06F 3/04842; G06F 17/345; G06F 17/30864; G06F 3/017; G06F 3/0414; G06F 17/302777; G06F 3/16; G06F 17/30528
See application file for complete search history.

(56) References Cited

U.S. PATENT DOCUMENTS

| | | | |
|---|---|---|---|
| 7,847,699 | B2 | 12/2010 | Lee et al. |
| 8,108,385 | B2* | 1/2012 | Kraft ................. G06F 17/30867 707/723 |
| 8,301,614 | B2* | 10/2012 | Kraft ................. G06F 17/30867 707/706 |
| 8,478,777 | B2 | 7/2013 | Li et al. |
| 8,812,540 | B2 | 8/2014 | Kraft et al. |
| 9,305,093 | B2 | 4/2016 | Mo et al. |
| 2002/0087535 | A1* | 7/2002 | Kotcheff ........... G06F 17/30265 707/E17.108 |
| 2002/0147724 | A1 | 10/2002 | Fries et al. |
| 2003/0191753 | A1 | 10/2003 | Hoch |
| 2004/0203886 | A1* | 10/2004 | Rohles .................... H04W 4/00 455/456.1 |
| 2005/0198567 | A1 | 9/2005 | Vermeulen et al. |
| 2005/0283752 | A1 | 12/2005 | Fruchter et al. |
| 2006/0026013 | A1 | 2/2006 | Kraft |
| 2006/0098899 | A1 | 5/2006 | King et al. |
| 2006/0129541 | A1* | 6/2006 | Morgan ............. G06F 17/30637 707/E17.062 |
| 2006/0167857 | A1 | 7/2006 | Kraft et al. |
| 2006/0168644 | A1 | 7/2006 | Richter et al. |
| 2006/0212415 | A1 | 9/2006 | Backer et al. |
| 2006/0253793 | A1 | 11/2006 | Zhai et al. |
| 2007/0143264 | A1* | 6/2007 | Szeto ................. G06F 17/30643 707/E17.067 |
| 2007/0266342 | A1 | 11/2007 | Chang et al. |
| 2007/0282797 | A1* | 12/2007 | Wang ................. G06F 17/30867 707/E17.109 |
| 2008/0005067 | A1 | 1/2008 | Dumais et al. |
| 2008/0005090 | A1* | 1/2008 | Khan ................. G06F 17/30864 707/E17.108 |
| 2008/0040316 | A1* | 2/2008 | Lawrence ......... G06F 17/30572 707/E17.059 |
| 2008/0045138 | A1* | 2/2008 | Milic-Frayling .. H04N 1/00244 455/3.04 |
| 2008/0057922 | A1 | 3/2008 | Kokes et al. |
| 2008/0250012 | A1 | 10/2008 | Hinckley et al. |
| 2008/0267504 | A1* | 10/2008 | Schloter ............ G06F 17/30879 707/E17.113 |
| 2008/0288452 | A1 | 11/2008 | Sadri et al. |
| 2009/0006343 | A1 | 1/2009 | Platt et al. |
| 2009/0070326 | A1 | 3/2009 | Kraft |
| 2009/0132316 | A1 | 5/2009 | Florance et al. |
| 2009/0287626 | A1 | 11/2009 | Paek et al. |
| 2009/0287681 | A1 | 11/2009 | Paek et al. |
| 2009/0327976 | A1 | 12/2009 | Williamson et al. |
| 2010/0028724 | A1 | 2/2010 | Byun et al. |
| 2010/0057728 | A1* | 3/2010 | Quick ................. G06F 17/3087 705/14.57 |
| 2010/0070484 | A1* | 3/2010 | Kraft ................. G06F 17/30867 707/706 |
| 2010/0146012 | A1 | 6/2010 | Beaudreau et al. |
| 2010/0205190 | A1* | 8/2010 | Morris .................... G06F 3/041 707/758 |
| 2010/0228724 | A1 | 9/2010 | Petri et al. |
| 2010/0235784 | A1 | 9/2010 | Ording et al. |
| 2010/0241663 | A1* | 9/2010 | Huang .................. G06Q 30/02 707/770 |
| 2010/0260426 | A1 | 10/2010 | Huang et al. |
| 2011/0043652 | A1 | 2/2011 | King et al. |
| 2011/0085211 | A1 | 4/2011 | King et al. |
| 2011/0153653 | A1* | 6/2011 | King ................. G06F 17/30253 707/769 |
| 2011/0161005 | A1 | 6/2011 | Hajianpour et al. |
| 2011/0191336 | A1 | 8/2011 | Wang et al. |
| 2011/0289098 | A1 | 11/2011 | Oztaskent et al. |
| 2011/0302532 | A1 | 12/2011 | Missig |
| 2012/0110009 | A1* | 5/2012 | Kraft ................. G06F 17/30867 707/769 |
| 2012/0117112 | A1 | 5/2012 | Johnston et al. |
| 2012/0185474 | A1 | 7/2012 | Hansen et al. |
| 2012/0185886 | A1* | 7/2012 | Charania ............ H04N 21/4312 715/716 |
| 2012/0197857 | A1 | 8/2012 | Huang et al. |
| 2012/0266060 | A1 | 10/2012 | Roberts et al. |
| 2012/0268485 | A1* | 10/2012 | Icho ................. G06F 17/30241 345/629 |
| 2013/0006957 | A1 | 1/2013 | Huang et al. |
| 2013/0024474 | A1* | 1/2013 | Kraft ................. G06F 17/30867 707/770 |
| 2013/0041921 | A1 | 2/2013 | Cooper et al. |
| 2013/0085848 | A1 | 4/2013 | Dyor et al. |
| 2013/0103712 | A1 | 4/2013 | Li et al. |
| 2013/0110804 | A1 | 5/2013 | Davis et al. |
| 2013/0135332 | A1 | 5/2013 | Davis et al. |
| 2013/0151339 | A1 | 6/2013 | Kim et al. |
| 2013/0180804 | A1 | 7/2013 | Asai |
| 2013/0226925 | A1 | 8/2013 | Carbonell et al. |
| 2013/0226935 | A1 | 8/2013 | Bai et al. |
| 2014/0089863 | A1 | 3/2014 | Mo et al. |
| 2014/0172892 | A1 | 6/2014 | Schechter et al. |
| 2014/0250120 | A1 | 9/2014 | Mei et al. |
| 2014/0324814 | A1* | 10/2014 | Kraft ................. G06F 17/30867 707/707 |
| 2015/0169067 | A1* | 6/2015 | Hong ................. G06F 17/30967 715/863 |

OTHER PUBLICATIONS

Hart, et al., "Query-free Information Retrieval," in Proceedings of Intelligent Systems and Their Applications, vol. 12, Issue 5, Menlo Park, CA., Sep. 1997, 13 pp.
Hung, "Reimagining Mobile Search: Introducing Yahoo!.RTM. Sketch-a-Search.TM. and Yahoo! Search for the iPhone," Published on: Mar. 23, 2010, 6 pp., Available at: http://ymobileblog.com/blog/2010/03/23/reimagining-mobile-search-introduc-               ing-yahoo%C2%AE-sketch-a-search%E2%84%A2-and-yahoo-search-for-the-iphone%C- 2%AE-2/.
Cong Yu and H. V. Jagadish "Querying Complex Structured Databases" VLDB '07, Sep. 23-28, 2007, Vienna, Austria—Proceeding VLDB '07 Proceedings of the 33rd international conference on Very large data bases—pp. 1010-1021.
"Google's Gesture Search available for Android 1.6," 2 pp., Published on: Mar. 17, 2010, Available at: http://blog.itechtalk.com/2010/googles-gesture-search-available-for-andro- id-1-6/.
Xin Yang, Sydney Pang and K. T. Tim Cheng—"Mobile Image Search With Multimodal Context-Aware Queries" Published in: 2010 IEEE Computer Society Conference on Computer Vision and Pattern Recognition—Workshops—Date of Conference: Jun. 13-18, 2010—San Francisco, CA—pp. 25-32.
International Search Report with Written Opinion dated May 9, 2014 in Application No. PCT/US2013/075625, 10 pages.
Non-Final Office Action dated Jul. 31, 2014 in U.S. Appl. No. 13/718,202, 26 pages.
Non-Final Office Action dated May 4, 2015 in U.S. Appl. No. 13/718,202, 30 pages.
Final Office Action dated Jan. 7, 2015 in U.S. Appl. No. 13/718,202, 31 pages.
Final Office Action dated Nov. 18, 2015 in U.S. Appl. No. 13/718,202, 33 pages.
Non-Final Office Action dated Mar. 3, 2016 in U.S. Appl. No. 13/718,202, 15 pages.
Notice of Allowance dated Jun. 22, 2016 in U.S. Appl. No. 13/718,202, 12 pages.
"Second Written Opinion Issued in PCT Application No. PCT/US2013/075625", dated Dec. 2, 2014, 7 Pages.
"Search Indication", Retrieved From: <<http://dl.acm.org/results.cfm?query=Search+Indication&Go.x=46&Go.y=19>>, Retrieved Date: Jun. 12, 2016, 3 Pages.

(56) References Cited

OTHER PUBLICATIONS

"First Office Action and Search Report Issued in Chinese Patent Application No. 201380066508.5", dated Oct. 31, 2017, 16 Pages.

* cited by examiner

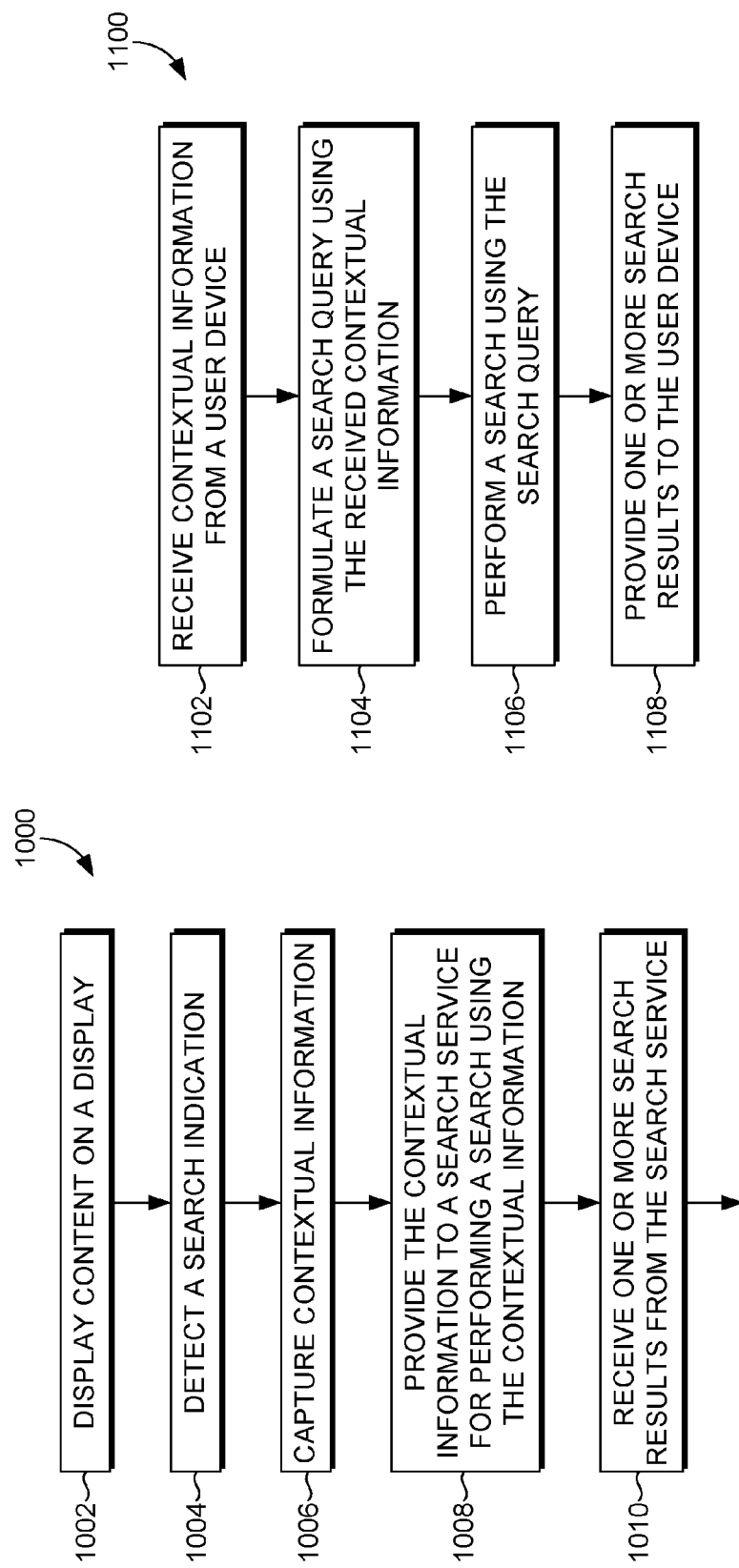

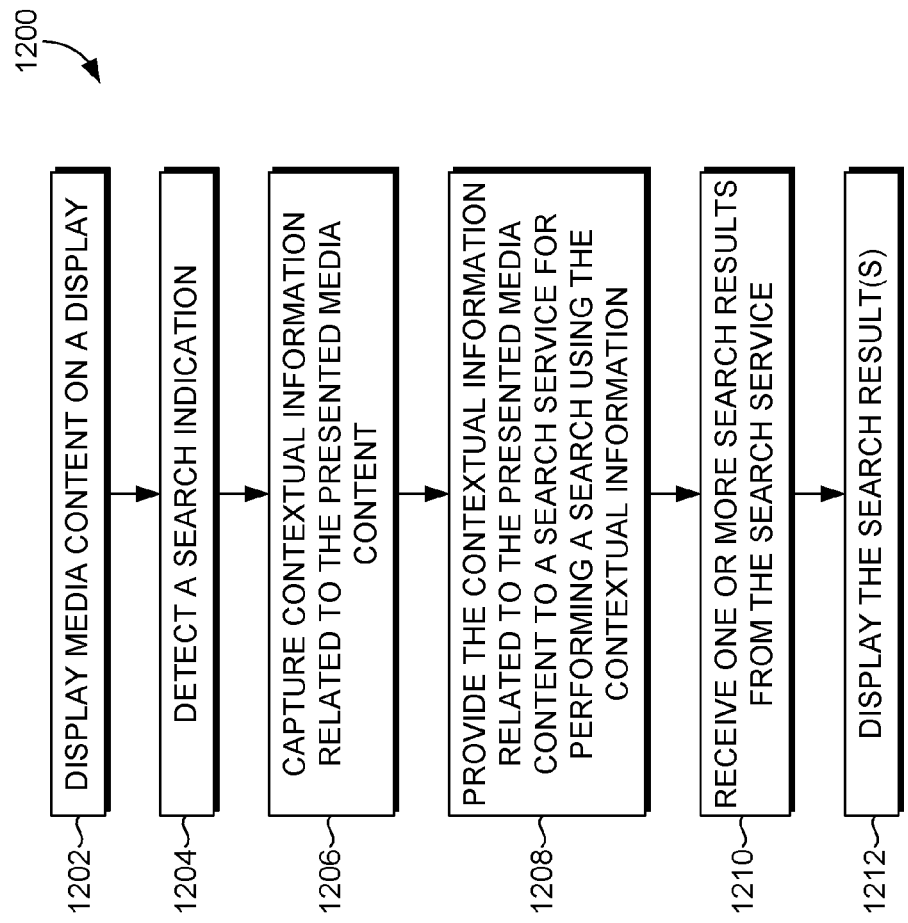

QUERYLESS SEARCH BASED ON CONTEXT

CROSS-REFERENCE TO RELATED APPLICATION

This application is a continuation of U.S. application Ser. No. 13/718,202, issued as U.S. Pat. No. 9,483,518 B2, filed Dec. 18, 2012, entitled "Queryless Search Based On Context," which is herein incorporated by reference in its entirety.

BACKGROUND

In order to find desired content, a computer user often makes use of a search service. Exemplary Internet search engines are well known in the art, for example, a commonly known commercial engine is the BING search engine provided by Microsoft Corporation of Redmond, Wash. Generally, to utilize a search service, a user initially opens a web browser and navigates to a home page associated with the particular search service. Thereafter, the user can enter a search query to obtain desired search results, for example, via a search box provided by the search service. Upon receiving search results related to the user-input search query, the user can sift through results to find desired information. Such a search process can be time consuming and inefficient, particularly if a user cannot particularly articulate a search query to obtain desired information.

SUMMARY

This summary introduces simplified concepts of facilitating queryless searching, which is further described below in the Detailed Description. This summary is not intended to identify essential features of the claimed subject matter, nor is it intended for use in limiting the scope of the claimed subject matter.

This application describes example embodiments of performing a queryless search based on a search indication provided by a user. In one example embodiment, a user may be viewing content via a user computing device. Such content may be any content that can be displayed via a display screen of a user device. For example, the user device may display textual content on a display to a user or may play a video and/or an audio to the user. The user device may subsequently receive a search indication from the user that indicates an intent to initiate a search using contextual information. Upon receiving such a search indication, contextual information can be automatically captured and utilized to initiate a search. In this regard, the user can view search results related to the contextual information captured by the user device without inputting a user search query.

BRIEF DESCRIPTION OF THE DRAWINGS

Embodiments of the invention are described in detail below with reference to the attached drawing figures, wherein:

FIG. 10 illustrates a first example for facilitating a queryless search, in accordance with embodiments of the present invention;

FIG. 11 illustrates a second example for facilitating a queryless search, in accordance with embodiments of the present invention; and FIG. 12 illustrates a third example for facilitating a queryless search, in accordance with embodiments of the present invention.

DETAILED DESCRIPTION

Figure 1:
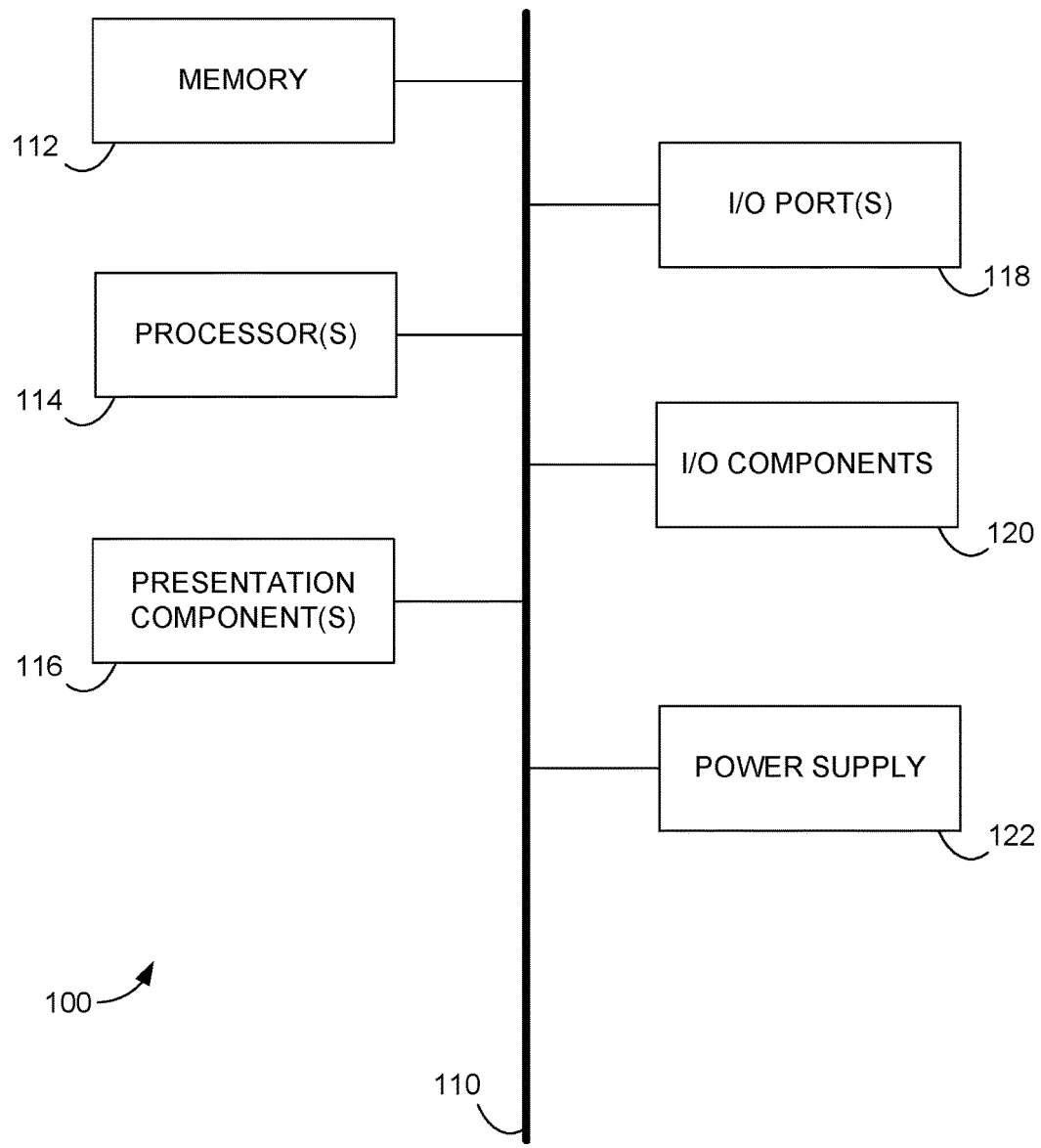
FIG. 1 is a block diagram of an exemplary computing device suitable for implementing embodiments of the invention.

Typically, when a user wants to search for certain information related to content a user is viewing (e.g., watching a television program, watching a video or video clip, browsing the web, reading an email, working on a word processing document, etc.), the user opens a web browser on a user computing device and connects with a search service. The user may query a search engine by entering a search query. Such a search query may be entered via a search box which is integrated with a web browser and/or webpage or run with the web browser as a toolbar, or through a separate application that uses the web browser as a platform to complete a search. In either case, the user manually enters the search query, either by typing or by cutting and pasting the search query from the task he/she was previously working on. Other existing technologies may allow a user to input a search query by activating a voice recognition function of the user's device, if available, to input voice commands and/or voice inputs, which are converted into text by a search application of the user's device or the search service.

In response to receiving the search query, the search service may return and present search results to the user on a results page. If the user wants to modify the search, the user may enter a modified search query into the text box and submit the modified search query to the search engine, which then returns new search results to the user. Once the user finds the desired information, he or she then exits the search service and returns to the task he/she was originally performing. Should the user need to refer to the search results or perform another search, the user must switch back and forth between his/her original task and the search service, thus disrupting his or her workflow.

The situation becomes even worse if a user is utilizing a user device that does not readily have functionality to facilitate a search and present search results, for example, via a web browser while the user is utilizing the user device. For example, assume a user is watching television and is interested in an actor or event presented via the television. In such a case, the user would generally access another user device, such as a laptop or mobile device, access a web page hosted by a search service (e.g., via a web browser), formulate a user query, enter the query, and sift through the search results. Further, formulating the query may be quite difficult if the user is unfamiliar with the name of the actor, event, or other details that might assist in providing the desired information.

In another example, a user may be viewing content (e.g., via a web page) that includes an image. The user may want to conduct a search for the image. To conduct the search, the user may need to know how to describe the image and provide a textual description of the image to a search engine, similar to the search process described above. Alternatively, the user may first save the image to local memory of the device and then upload the image to a search engine that allows content based image retrieval. In both cases however, the user is required to go through a number of steps in order to perform the image search. Furthermore, some mobile devices such as mobile phones having limited memory and/or functional capabilities may not allow storage of an image from the Internet into the mobile device or may require cumbersome procedures to do so. These are just some examples of difficulties that exist with searching using mobile phones and other client devices.

Embodiments of the present invention are directed to facilitating queryless searches, which allow a search to be performed in response to a user indication without additional input from a user. In this regard, aspects of the present invention enable a user to be presented with information related to content being viewed by the user without the user being required to formulate and/or input a query. That is, to view data related to content being viewed by a user, the user may simply provide an indication of such a desire without inputting or submitting a query, such as a text query. In embodiments, a queryless search is performed using only contextual information derived by a user computing device.

Generally, a user device displays or causes display of content to a user via a display screen. Such content may be any content that can be displayed via a display screen of a user device. For example, the user device may display textual content on a display to a user or may play a video and/or an audio to the user. The user device may subsequently receive a search indication from the user that indicates an intent to initiate a search using contextual information. Upon receiving such a search indication, contextual information can be captured and utilized to initiate a search. In this regard, the user can view search results related to the contextual information captured by the user device without inputting a user search query.

Embodiments of the invention described herein include a computer-implemented method of facilitating a queryless search. The method includes recognizing a search indication provided by a user to indicate a desire to view search results related to content being presented. Such a search indication is performed without accessing a web page associated with a search engine. In accordance with the search indication, contextual information related to the content being presented is automatically captured. The contextual information is automatically provided to initiate a search for information corresponding with the contextual information. Thereafter, search results corresponding with the contextual information are received.

In a second illustrative embodiment, one or more computer-readable media storing instructions that, when executed by a processor, configure the processor to perform acts. The acts include detecting a search indication comprising an action performed by a user in association with a controller. In response to detecting the search indication, contextual information related to media content being displayed at or near detection of the search indication is automatically obtained. A search to be performed is initiated using the contextual information by automatically communicating the contextual information at least to a remote search service that formulates a query based on the contextual information. Search results are received related to the obtained contextual information.

In a third illustrative embodiment, a user device includes a processor; memory communicatively coupled to the processor; and a display screen configured to display content. The user device also includes a search detector component to detect a search indication that provides an indication to perform a search using contextual information, wherein the search indication does not specify any text for use in performing the search. The user device further includes a context capturer component to automatically capture contextual information in accordance with detecting the search indication, wherein at least a portion of the contextual information corresponds with a time at or near detection of the search indication. The user device additionally includes a search presenting component to cause presentation of one or more search results that correspond with the contextual information, wherein the one or more search results are presented in association with the displayed content.

Multiple and varied implementations and embodiments are described below. The following section describes an example environment that is suitable for implementing gesture-based search. The following sections describe illustrative aspects of the gesture-based search techniques.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "tablet," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The memory 112 is an example of computer readable media. Computer-readable media includes at least two types of computer readable media, namely computer storage media and communications media.

Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Figure 2:
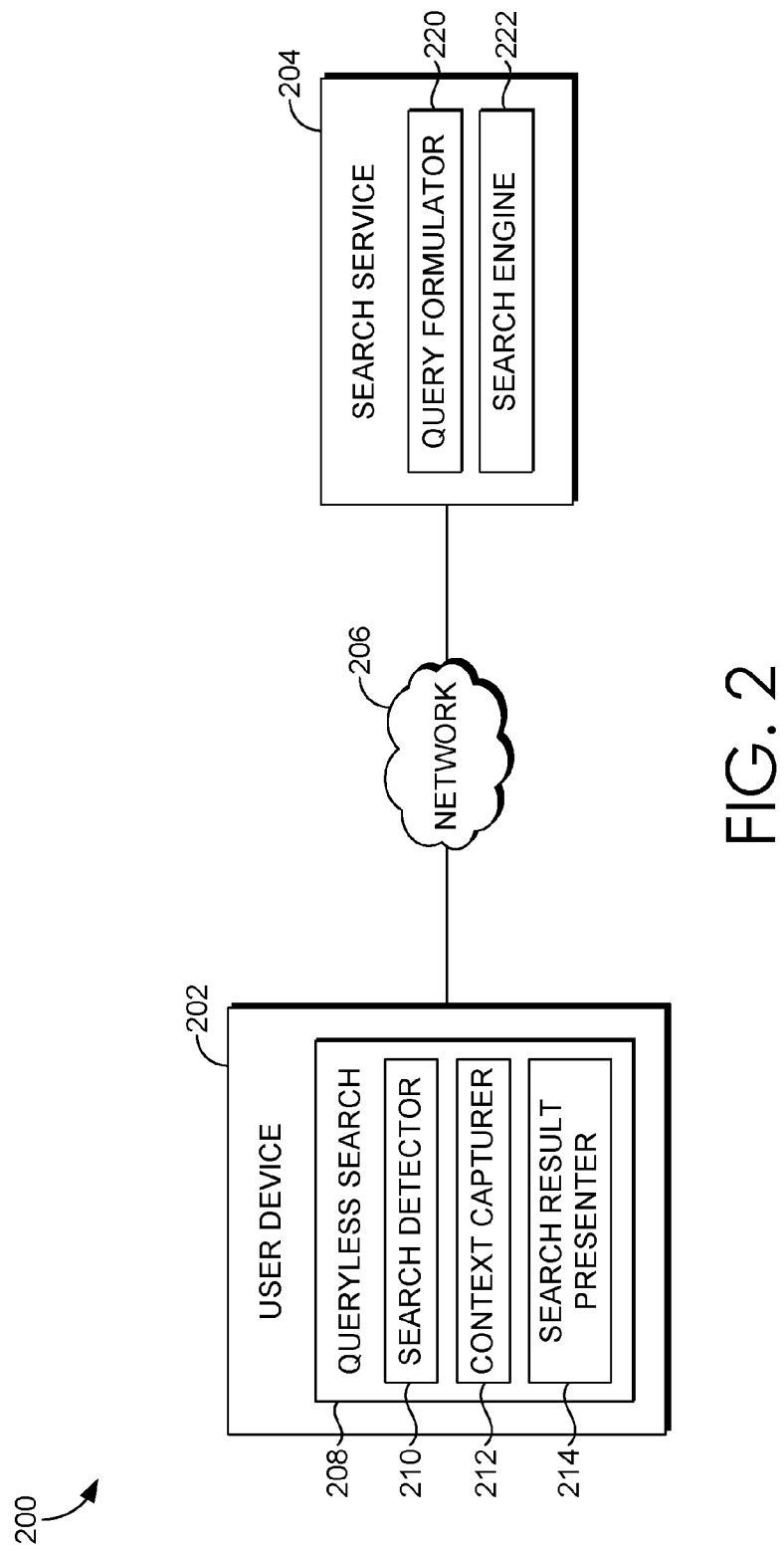
FIG. 2 is a schematic diagram of an exemplary environment including a user device usable to implement queryless searches, in accordance with an embodiment of the present invention.

FIG. 2 is a schematic diagram of an example environment 200 usable to facilitate viewing search results related to items within content. The environment 200 includes a user device 202 and a search service 204 in communication with one another via a network 206. The user device 202 and the search service 204 can communicate through a network 206 or a combination of networks (not shown), which may include any number of networks such as, for example, a local area network (LAN), a wide area network (WAN), the Internet, a cellular network, a peer-to-peer (P2P) network, a mobile network, or a combination of networks.

The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 202 and the search service 204 may be integrated in a single component (e.g., the user device 202) or may directly communicate with one another.

The user device 202 can be any kind of computing device or devices capable of initiating a queryless search. For example, the user device 202 can be a computing device such as computing device 100. The user device 202 may be implemented as any one of a variety of conventional computing devices such as, for example, a desktop computer, a notebook or laptop computer, a netbook, a tablet or slate computer, a surface computing device, an electronic book reader device, a workstation, a mobile device (e.g., Smartphone, personal digital assistant, in-car navigation device, etc.), a game console, a set top box, or a combination thereof. Depending on the type of user device, user device may include, for example, a touch screen or other display, a keyboard, a mouse, a touch pad, a roller ball, a scroll wheel, an image capture device, an audio input device, an audio output device, and/or any other input or output devices.

The user device 202 may include any number of applications that are capable of, among other things, displaying content to a user on a display of the user device 202 or on a display associated with or connected to the user device 202. By way of example and not limitation, applications may include a desktop environment (e.g., icons, windows, toolbars, folders, wallpapers, desktop widgets, etc.), a web browser, an email client, a word processing application, a spreadsheet application, a voice recording application, a calendaring application, a news application, a text messaging client, a media player application, a photo album application, an address book application, a viewfinder application, a social networking application or a game.

In embodiments, the user device 202 includes a search detector 210, a context capturer 212, and a search result presenter 214. In some embodiments, one or more of the illustrated components/modules may be implemented as stand-alone applications. In other embodiments, one or more of the illustrated components/modules may be implemented via an operating system or integrated with an application running on a device. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of computing devices.

The search detector 210 of the user device 202 is configured to receive, recognize, or detect a search indication. A search indication refers to any indication to initiate and/or perform a search using contextual information. In this regard, a user utilizing the user device 202 can provide a search indication to initiate a queryless search in any of a variety of manners. As such, a search indication is performed without accessing a web page associated with a search engine or a search application configured to receive a user query.

The search indication may include, but is not limited to, touch input to a touch screen, touch pad, button associated with the user device; a motion of the user device; a body motion detected by an image capture device of the user device; a motion of a component associated with the user device (e.g., a remote control); a motion of a cursor controlled by a mouse or other user input device; and/or a voice command.

With regard to a touch input to a touch screen, touch pad, button, etc. associated with a user device, the search detector 210 can be configured to detect such user interaction. That is, touch input from one or more fingers of the user or a pointing device such as a stylus or digital pen can provide a search indication. For example, a particular button on a remote control (e.g., a mechanical button or a touch button), if selected, can be configured to initiate a search based on contextual information. In another example, a touch input of an icon or link can initiate a search based on contextual information (e.g., an icon on a toolbar or desktop, etc.).

Additionally or alternatively, the search indication may include a motion of the user device itself. The motion of the user device may be detected by, for example, an accelerometer, an attitude sensor, a compass, etc. The motion of the user device may indicate an intent of the user to initiate a search related to the content being presented via the user device. Any predetermined motion could be used to signify a search indication.

In additional or alternative embodiments, the search detector 210 might be configured to detect a body motion, for example, using an image capture device of the user device. In this regard, the search indication may include a motion of a body or a part of the body of the user such as a finger, a hand, head, eye, and/or an arm. Such body motion may be detected using a camera, other image capture device, or any motion detection component of the user device 202. For example, the user device may be a gaming device with a camera or other motion detection interface such as an Xbox® gaming console configured with a Kinect™ motion detection system, both available from Microsoft Corporation of Redmond Wash. The user device may receive and interpret images or signals the user device received to determine what motion the user is performing. The motion of the user may provide an indication of a desire to perform a search based on contextual information in association with the content being viewed by the user. Any predetermined motion could be used to signify a search indication.

Similarly, the search detector 210 might be configured to detect a motion of a component associated with the user device (e.g., a remote control), for example, using an image capture device of the user device. In this regard, the search indication may include a motion of a component associated with the user device such as a remote control, a game controller, pointer, joystick, etc. Such a motion may be detected using a camera, other image capture device, or any motion detection component of the component associated with the user device 202 (e.g., accelerometer, gyroscope, etc). For example, the user device may be a gaming device with a camera or other motion detection interface. The user device may receive and interpret images or signals the user device received to determine what motion the user is performing using a component. The motion of the component may provide an indication of a desire to perform a search based on contextual information in association with the content being viewed by the user. Any predetermined motion could be used to signify a search indication.

Alternatively or additionally, the search detector 210 may detect motion of a cursor controlled by a mouse, track ball, or other input device coupled to the user device 202. Accordingly, the search detector 210 may detect the motion of the cursor controlled by the input device. Further, use of a input device to select an icon, link, etc. can also be used to provide a search indication (e.g., a selection of an icon on a toolbar or desktop, hovering over an icon, etc.).

In some embodiments, a search indication may indicate or identify a search scope. For instance, a search indication may indicate a particular item or content being displayed that is of interest to the user (e.g., textual information, image information, visual information of audio information, video information, etc.) Such a search scope can more narrowly focus the scope of the search initiated by the user without the user providing a query. For example, a search indication might substantially bound an item being displayed; touch, overlay, or overlap an item being displayed; or otherwise provide an indication of a particular item or content of interest to the user. In some examples, a motion may define a search scope. For instance, the region of content defined by the motion may be content that is substantially bounded by the motion (e.g., a generally circular motion), content that is touched or overlapped by the search indication, or the like. In embodiments, a search scope provided is non-text. In this regard, the user does not indicate any text to utilize for a search (e.g., by way of user input, such as a keyboard, a touch input, etc. and/or by way of a voice input). Such a non-text search scope may indicate an image or a portion of a video for use in specifying a search.

In some embodiments, the user device 202 may display a representation of the search scope defined by the search indication on the displayed content, to provide visual feedback to the user of the search scope. The representation of the search scope may comprise, for example, a line enclosing an item(s) of interest, a highlighting view of the item(s) of interest, and/or a magnifying lens view of the item(s) of interest.

The context capturer 212 is configured to initiate capturing or obtaining of contextual information with which a search can be performed. Contextual information refers to information that describes or indicates context associated with the presented content. In embodiments, contextual information is captured at the time or substantially near the time the search indication is detected. Such contextual information can pertain to the displayed content being viewed by the user, the user of the user device, and/or the user device itself.

Contextual information associated with the displayed content being presented by the user device can refer to content being displayed (e.g., at or near a time of detecting a search indication), content or an item identified as a particular search scope, content near a specified search scope, a title of a displayed content, a uniform resource locator where the displayed content is located, an image within the content being displayed, metadata associated with displayed content (e.g., metadata describing text, metadata describing audio media, metadata describing video media, etc.), an audio portion being presented, a video portion being presented, a channel being presented, a time, location, or frame being presented at or near of detecting the search indication, and/or the like.

Contextual information associated with displayed content can be obtained in any number of ways. In some embodiments, the context capturer 212 can perform object, image, facial, audio, or video recognition or access another component that can perform such functionality (e.g., another component within the user device or a remote computing device). As another example, the context capturer 212 can access metadata associated with the displayed content and capture such metadata or can access another component that has metadata associated with the displayed content. In yet other embodiments, the context capturer 212 can additionally or alternatively capture content displayed (e.g., an image, a video clip, text, etc.).

Contextual information associated with the user device can refer to, for example, information related to the user device, applications running on the user device, or location of the user device. In this regard, the context capturer 212 can capture contextual information including information related to an application used to display the displayed content, information associated with other applications being run by the user device (e.g., active applications), location data of the user device (e.g., using GPS data), or the like.

Contextual information associated with the user can refer to any user data, such as the user profile (e.g., user demographics, user preferences, etc.), previous user searches, user contacts (e.g., social network contacts or friends, relationships of contacts), location of the user (e.g., where is the user positioned in a room), an address book, a contact list, a calendar, call logs, social data gathered from social networks, contacts, telephone logs, text message logs, affiliations and memberships of the user, files, images, photos, emails, or any other content or data stored on or shared via the user device. Contextual information can also refer to third-party data. In this regard, contextual information might include, for instance, activities, actions, searches, etc. being performed by users similar to the current user (e.g., similar by way of a network contact or any other means for detecting similarity, such as past actions, demographics, specified user interests, etc.). For example, contextual information could include what user similar to the current user have done in a similar setting or context. Such data could be obtained locally or be provided to the search service by a third-party user device.

Further, contextual information associated with the user can also refer to contextual information that can be captured on any other computing device being used by the user at or near the time of the search indication. In this regard, assume a user is requesting a search be performed in association with a television program being presented on his or her television (e.g., via a set top box). Further assume that the user is performing Internet searches on his or her mobile device while watching the television program. In such a case, the context capturer 212 may be configured to communicate with other user computing devices to capture contextual information associated with other actions being performed by the user at or near the time the user provided a search indication to obtain search results related to content being displayed on a particular device.

By way of example only, assume that a user is watching an awards program presented via live television and a particular actor is presented with an award. Further assume that the user is unaware of that particular actor, but would like to know more information about the actor, such as a list of shows or movies in which the actor has appeared. As a result, the user provides a search indication which is detected by the search detector 210. In such a case, the context capture 212 can capture any text being displayed in association with the live television program (e.g., actor's name), metadata associated with programming information, an image of the actor, audio associated with the live television program, a time of the search indication, a time of the live television program, a channel on which the live television program is presented, a user identifier, a location of the user within the room, and/or the like. Further, information concerning actions being performed by the user on other user devices can also be captured and utilized to perform a search. Assume that search results for the actor, the movie, and the awards ceremony are identified as relevant. In some cases, the identified search results are presented to the user. Additionally or alternatively, the three different types of search results can be presented to the user such that the user can select a type of search results most interesting to the user resulting in display of search results related to the selected type. The identified search results and/or type of search results can be positioned on the display screen in accordance with relevance or other ranking mechanism.

As previously described, in some cases, a search indication may indicate a search scope, that is, specify an item or content of particular interest to the user. In such embodiments, the context capturer 212 can be configured to determine if an object or content is associated with a search indication. In this regard, the context capturer 212 determines or identifies whether content has been specified in association with a search indication. If so, the context capturer 212 can determine that a search associated with the selected content or object should be initiated such that relevant search results can be displayed to the user.

Upon capturing contextual information, the context capturer 212 can provide the contextual information to the search service 204. For example, as illustrated, the context capturer 212 can provide contextual information to the search service 204 using the network 206. In other embodiments, the search service 204, or a portion thereof, can be integrated with the user device or other device connected thereto such that a local search can be performed. In some embodiments, the local search may include a search within the application having the content of interest. In other embodiments, the local search may include a search within local memory of the entire user device or a designated memory or folder of the user device.

In embodiments, the search service 204 includes a query formulator 220 and a search engine 222. In some embodiments, one or more of the illustrated components/modules may be implemented as stand-alone applications. In other embodiments, one or more of the illustrated components/ modules may be implemented via an operating system or integrated with an application running on a device. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of computing devices. For example, the search engine 222 may function utilize a set of computing devices.

The query formulator 220 of the search service 204 is configured to formulate queries utilizing the contextual information obtained, for instance, by the context capturer 212 of the user device. In some embodiments, the query formulator 220 may perform (or access another component that can perform) content recognition. For instance, in some cases, the query formulator 214 may receive an image and may perform image recognition in order to generate or formulate an appropriate query. Other functions described as being performed by the context capturer 212 may additionally or alternatively be performed by the query formulator 220. In formulating queries, the query formulator 220 may utilize all or a portion of the received or determined contextual information.

The search engine 222 is configured to perform a search for search results related to the contextual information, or query formulated therefrom. The search engine 222 might employ any number of computing devices, services, or engines to identify search results related to the contextual information. Search results can be any information associated with the contextual information or formulated query. In some embodiments, search results can be similar to traditional search results provided by Internet search engines, such as a set of links deemed relevant to the query. In other embodiments, search results can be information that is provided that is deemed relevant. By way of example, and without limitation, search results may include web results, multimedia results, music results, tweets or social posts from the user's social network, representations of media associated with the currently viewed media, information associated with displayed content such as an image or video (e.g., identification of an actor/actress or other movie item), an option to view a movie, an indication of a local copy of a media (e.g., a movie), advertisements, similar or related media content, combinations thereof, etc. In some cases, search results can be returned via non-visual means (i.e., read aloud by the device with or without any screen representation). In some embodiments, a search result may be an action indication that can be selected to result in performance of an action. For example, an action indication may be a save action that, if selected, saves displayed content or contextual information; a purchase action that, if selected, enables a user to purchase an item associated with the displayed content; a view action that, if selected, results in displaying additional information regarding the displayed content, or a portion thereof; a communication action that, if selected, results in information being communicated (e.g., email, social post, text message, etc.), or the like.

As can be appreciated, the search engine 222 might reference a data store or index (e.g., a local and/or remote data store or index) to identify, reference, lookup, or determine search results. As such, the search engine 222 can utilize the received contextual information, or a query derived therefrom, to identify related search results deemed relevant to the user based on the search indication. In some embodiments, the search engine 222 may take the form of an Internet search engine. For example, a commonly known commercial engine is the BING search engine provided by Microsoft Corporation of Redmond, Wash. Such a search engine 222 may perform the search or facilitate the search by accessing other components or devices to obtain relevant search results.

Upon obtaining search results, the search engine 222 can provide the search results, or a portion thereof, to the search result presenter 214 of the user device 202. The search result presenter 214 can present or cause presentation of the search results, or a portion thereof, via a display screen of the user device. As can be appreciated, the search results can be displayed at any position or location within the display screen. In some embodiments, the search results might be displayed at or near the top of the display view, at the center of the display view, outside of an active window, in association with a display edge, at an optimal location based on the displayed content, overlaid over displayed content, integrated with displayed content, etc. Accordingly, in some cases, the search result presenter may determine a location at which to display the search results.

Figure 3:
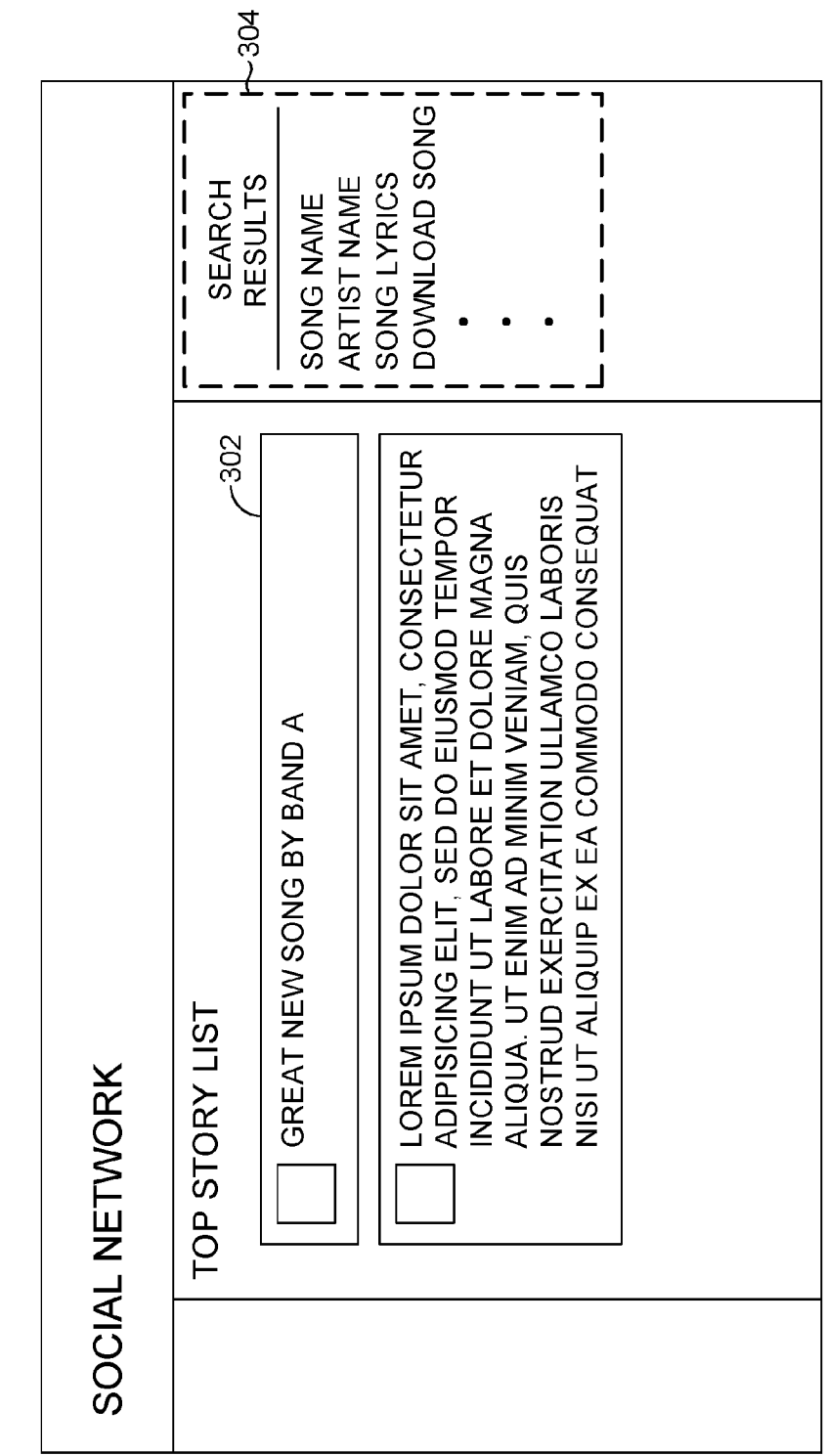
FIG. 3 is a schematic diagram that illustrates a first example in which a queryless search is performed in association with a social networking application, in accordance with an embodiment of the present invention.

FIGS. 3-9 illustrate various use scenarios possible using queryless search implementations. Various implementations associated with a social network application are provided in FIGS. 3-5. Initially, FIG. 3 illustrates an example in which the queryless search is performed using a user device in association with a social networking application (e.g., a web-enabled application or non-web enabled application). Assume a user is using a social networking application running on a user device, such as a laptop, tablet, or other mobile device. The user device may present social networking content 300 on a display of the user device. The presented content may include text, an image, audio content, video content, and/or the like. The queryless search techniques described herein are applicable to any application that displays or otherwise presents content to a user.

Now assume that a user is particularly interested in a friend's post 302 regarding a newly released song and, as such, performs a search indication in association with the post 302. Such a search indication may be, for instance, hold or position a finger over the post, hover cursor over the post, select the post using a cursor, etc. Upon recognizing such a search indication associated with the post 302, capturing contextual information is automatically initiated. Contextual information may include, for instance, a social network identifier, a name of a friend or contact that posted the song, a name of the song (e.g., identified via the content displayed or metadata), etc. In accordance with a search using the contextual information, or a query automatically generated in association therewith, various search results 304 can be received and presented at the user device. Search results 304 may include, for instance, the name of the song, the album name, the artist name, other information about the song such as lyrics, other similar songs, links to videos having the song, a link to download the song, for instance, to the user's music collection (e.g., using a user identifier that captured as context), or the like.

Figure 4:
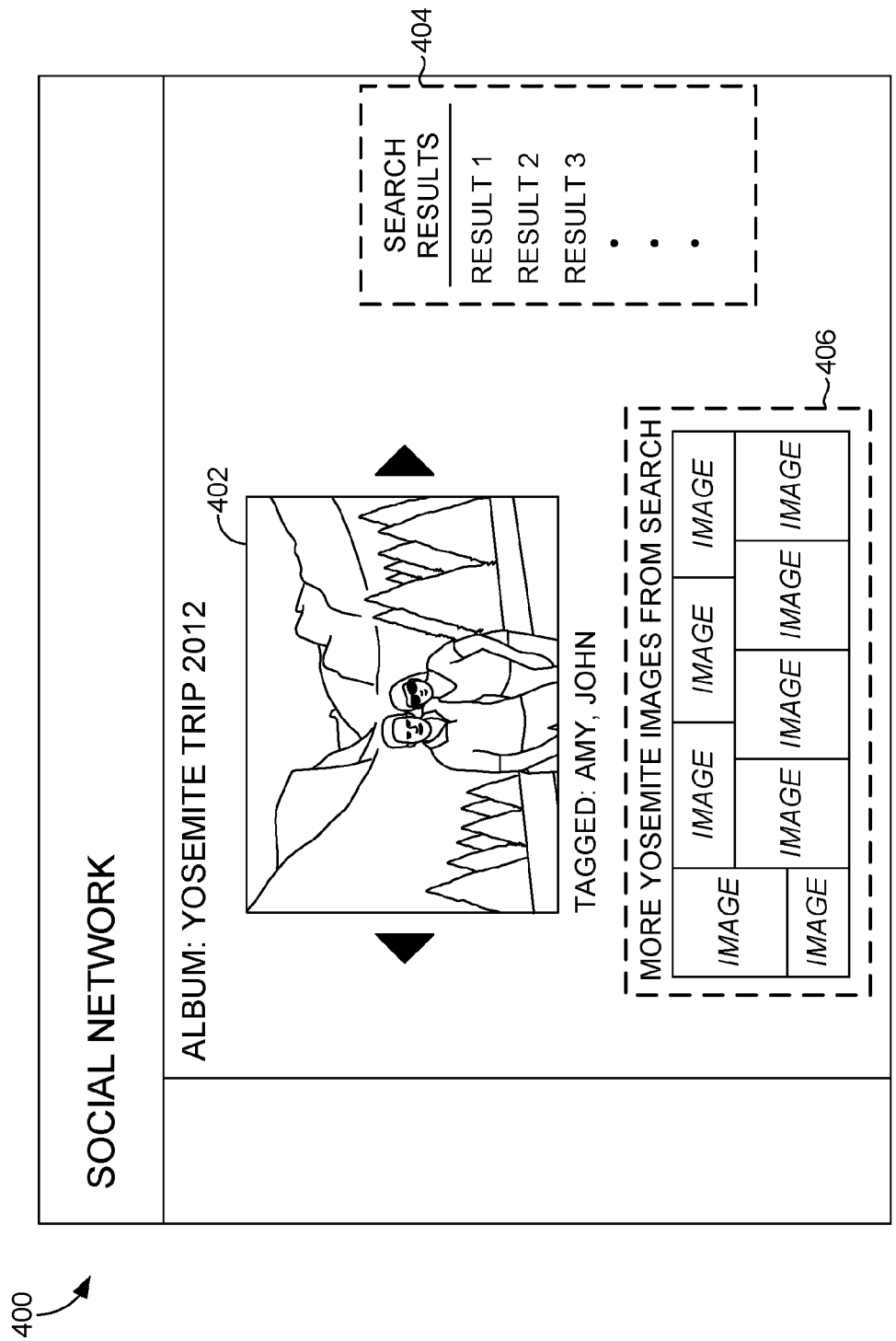
FIG. 4 is a schematic diagram that illustrates a second example in which a queryless search is performed in association with a social networking application, in accordance with an embodiment of the present invention.

FIG. 4 illustrates another example in which the queryless search is performed using a user device in association with a social networking application (e.g., a web-enabled application or non-web enabled application). Assume a user is using a social networking application running on a user device, such as a laptop, tablet, or other mobile device. The user device may present social networking content 400 on a display of the user device. The presented content may include text, an image, audio content, video content, and/or the like. The queryless search techniques described herein are applicable to any application that displays or otherwise presents content to a user.

Now assume that a user is particularly interested in a friend's post 402 regarding a photo posted by a network contact and, as such, performs a search indication in association with the post 402. Such a search indication may be, for instance, hold or position a finger over the post, hover a cursor over the post, select the post using a cursor, etc. Upon recognizing such a search indication associated with the post 402, capturing contextual information is automatically initiated. Contextual information may include, for instance, image data (e.g., tags designated or assigned to the image), the user posting the image, date of image posting, time of image posting, date and/or time of image capturing, recognition of scene in image, recognition of individuals in image (e.g., using facial recognition in association with network contacts), etc. In accordance with a search of the contextual information, or a query automatically generated in association therewith, various search results 404 can be received and presented at the user device. Search results 404 may include, for instance, information about Yosemite National Park (as identified, for instance, via photo tags), vacation planning information, advertisements/deals associated with Yosemite National Park, vacation planning, information about other individuals identified in the photo, or the like. Further, in some embodiments, search results may include additional images 406. Such images may be similar in nature or subject matter as image 402 or contain some or all of the individuals that are included in image 402.

Figure 5:
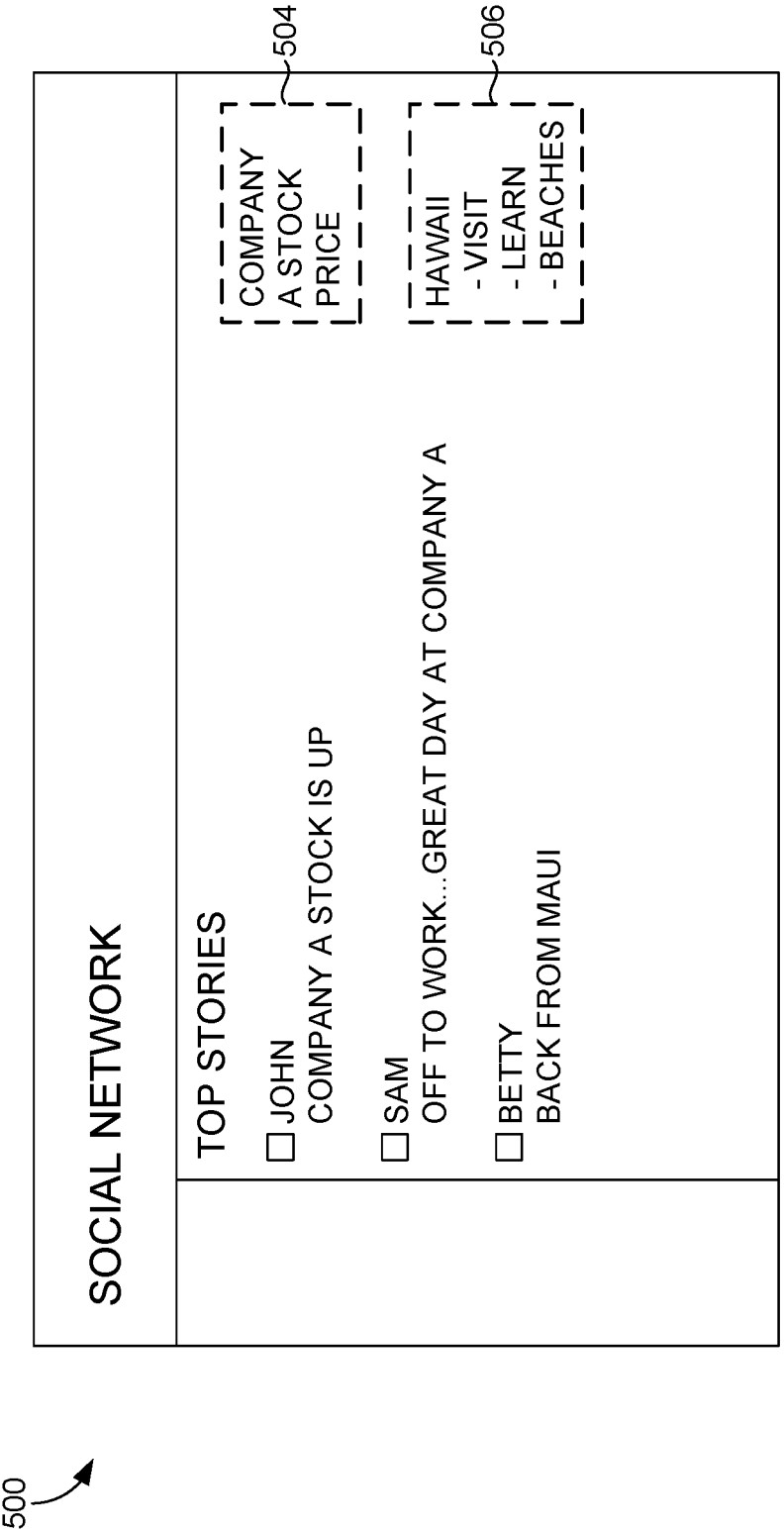
FIG. 5 is a schematic diagram that illustrates a third example in which a queryless search is performed in association with a social networking application, in accordance with an embodiment of the present invention.

FIG. 5 illustrates another example in which a queryless search is performed using a user device in association with a social networking application (e.g., a web-enabled application or non-web enabled application). Assume a user is using a social networking application running on a user device, such as a laptop, tablet, or other mobile device. The user device may present social networking content 500 on a display of the user device. The presented content may include text, an image, audio content, video content, and/or the like. The queryless search techniques described herein are applicable to any application that displays or otherwise presents content to a user.

Now assume that a user is not interested in any particular post, but is generally interested in information that may be useful or interesting to the user. Accordingly, the user performs a search indication generally associated with the social networking content 502. Such a search indication may be, for instance, hold or position finger over an edge of the application or page, select an icon or button, etc. Upon recognizing such a search indication associated with the content 502, capturing contextual information is automatically initiated. Contextual information may include, for instance, content of posts, image data associated with posted photos (e.g., metadata, users tagged, etc.), and/or the like. Assume that extracted contextual information indicates that a number of friends were posting about a particular company's stock (i.e., company A) and a location of photos posted by a friend (i.e., Hawaii) as well as user information such as that the user is interested in travel and investing. In accordance with a search using such contextual information, or a query automatically generated in association therewith, various search results 504 and 506 can be received and presented at the user device. For example, search result 504 includes a stock quote for company A, and search result 506 includes content related to Hawaii, such as tourist information, state information, various beaches, etc.

Figure 6:
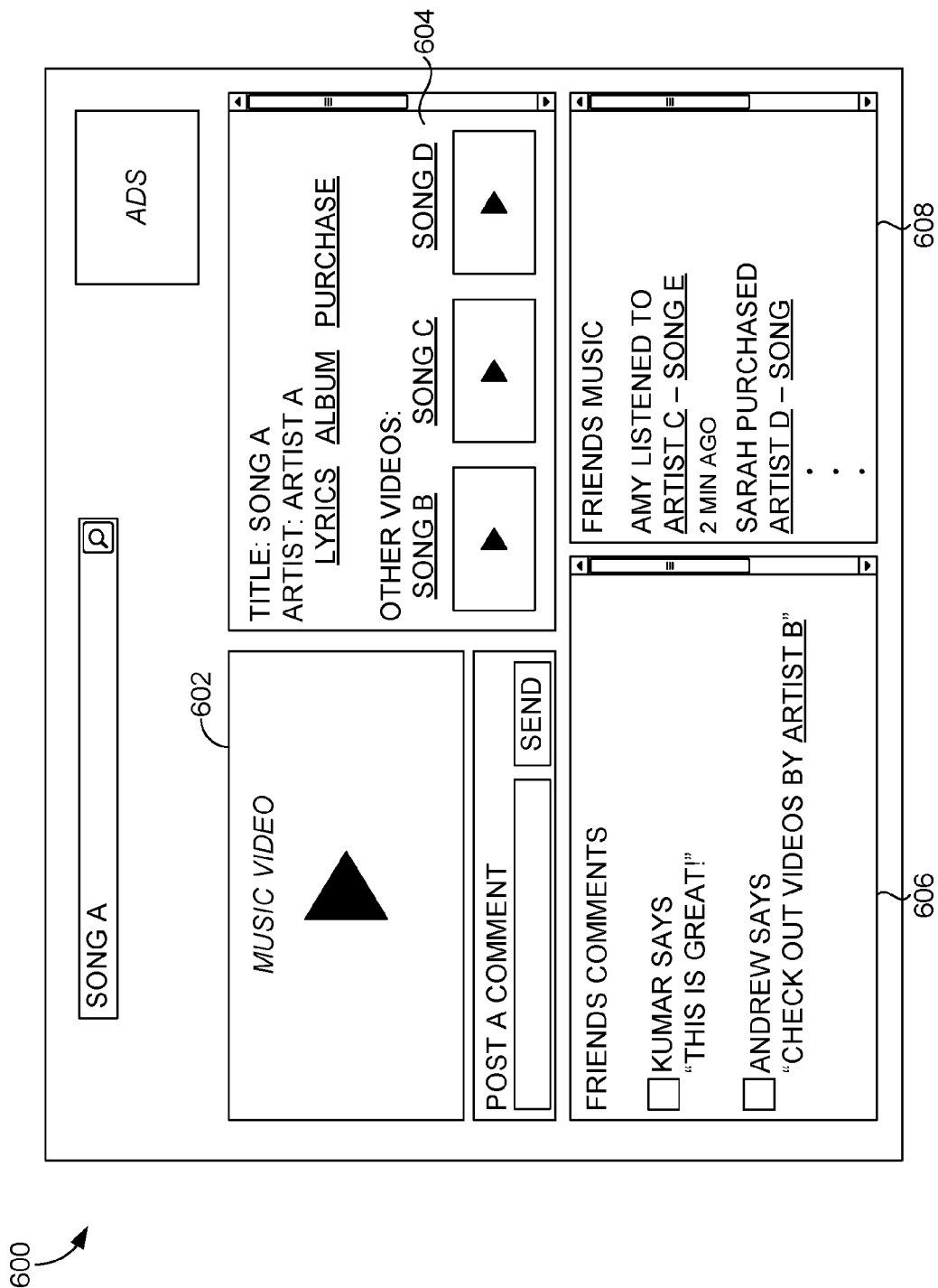
FIG. 6 is a schematic diagram that illustrates an example in which a queryless search is performed in association with a video hosting application, in accordance with an embodiment of the present invention.

Turning now to FIG. 6, FIG. 6 illustrates an example in which a queryless search is performed using a user device in association with a video hosting application (e.g., a web-enabled application or non-web enabled application). Assume a user is using a video hosting application 600 running on a user device, such as a laptop, tablet, or other mobile device. The user device may present video content 602 on a display of the user device. The presented content may include or be associated with text, an image, a video, a video clip, etc. For example, the user may view a video or video clip presented by a web browser on the display as shown in FIG. 6. The queryless search techniques described herein are applicable to any application that displays or otherwise presents content to a user.

Now assume that a user is interested in the particular video 602 being viewed by the user and, as such, performs a search indication in association with the video 602. Such a search indication may be to, for instance, hold or position a finger over the video, hover cursor over the video, select the video using a cursor, etc. Upon recognizing such a search indication associated with the video 302, capturing contextual information is automatically initiated. Contextual information may include, for instance, a name of the video (e.g., identified via the content displayed or metadata), a time/date of the video post or video capture, a poster's name or identifier, etc. In accordance with a search using the contextual information, or a query automatically generated in association therewith, various search results can be received and presented at the user device. By way of example, search results 604 pertain to information about the video (e.g., the name of the video, the name of an actor, actress, singer, etc.) and other similar or related videos (e.g., videos of similar songs). Search results 606 pertain to posts from the user's network contacts that commented on the video 602. Search results 608 pertain to videos selected or viewed by the user's network contacts. Any type of search results can be presented and those provided in FIG. 6 are merely exemplary in nature. For example, search results may include an audio associated with the video, an option to purchase the video or audio, other related videos or audios (e.g., related by poster, date, actor, producer, rating, subject matter, etc.), or the like.

Figure 7:
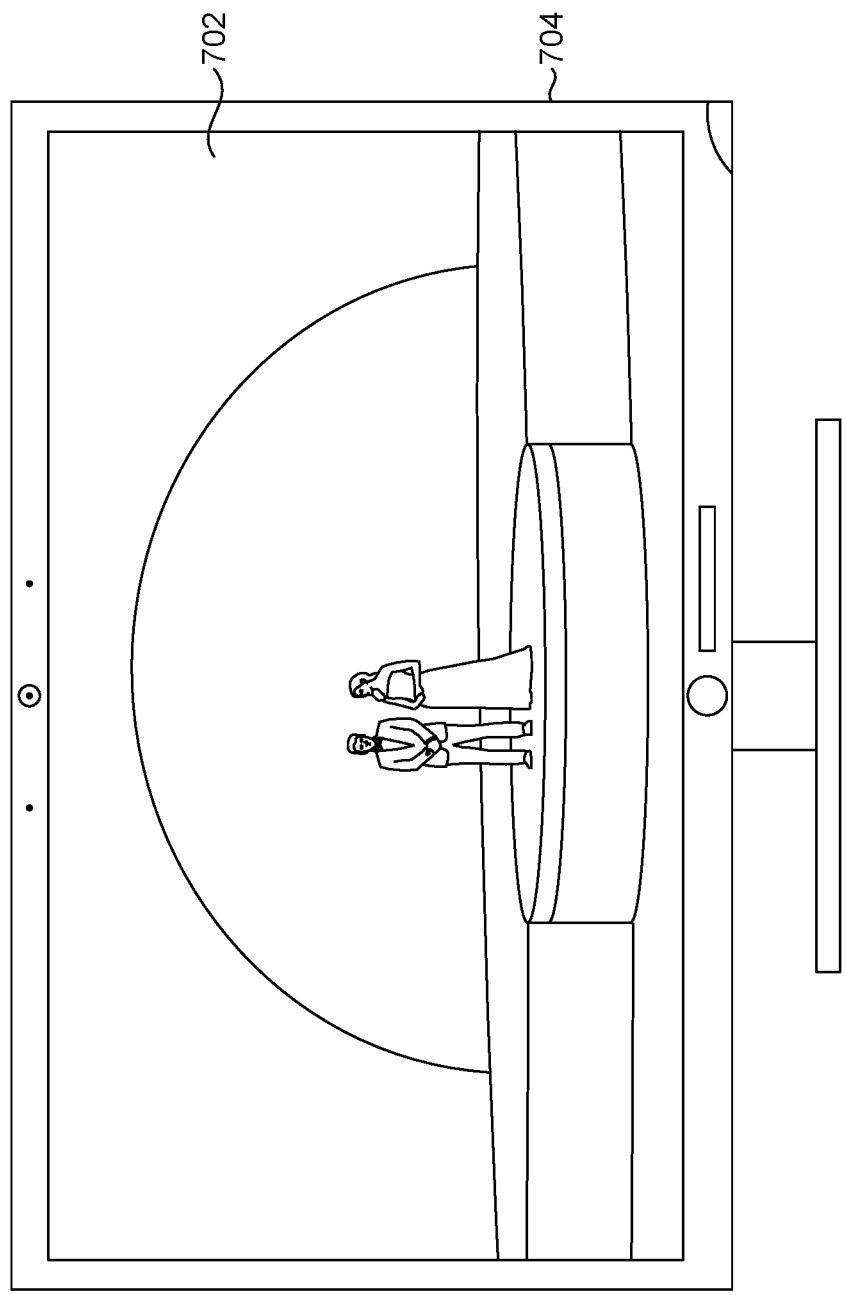
FIG. 7 is a schematic diagram that illustrates an example of a displayed television program, in accordance with an embodiment of the present invention.
Figure 8:
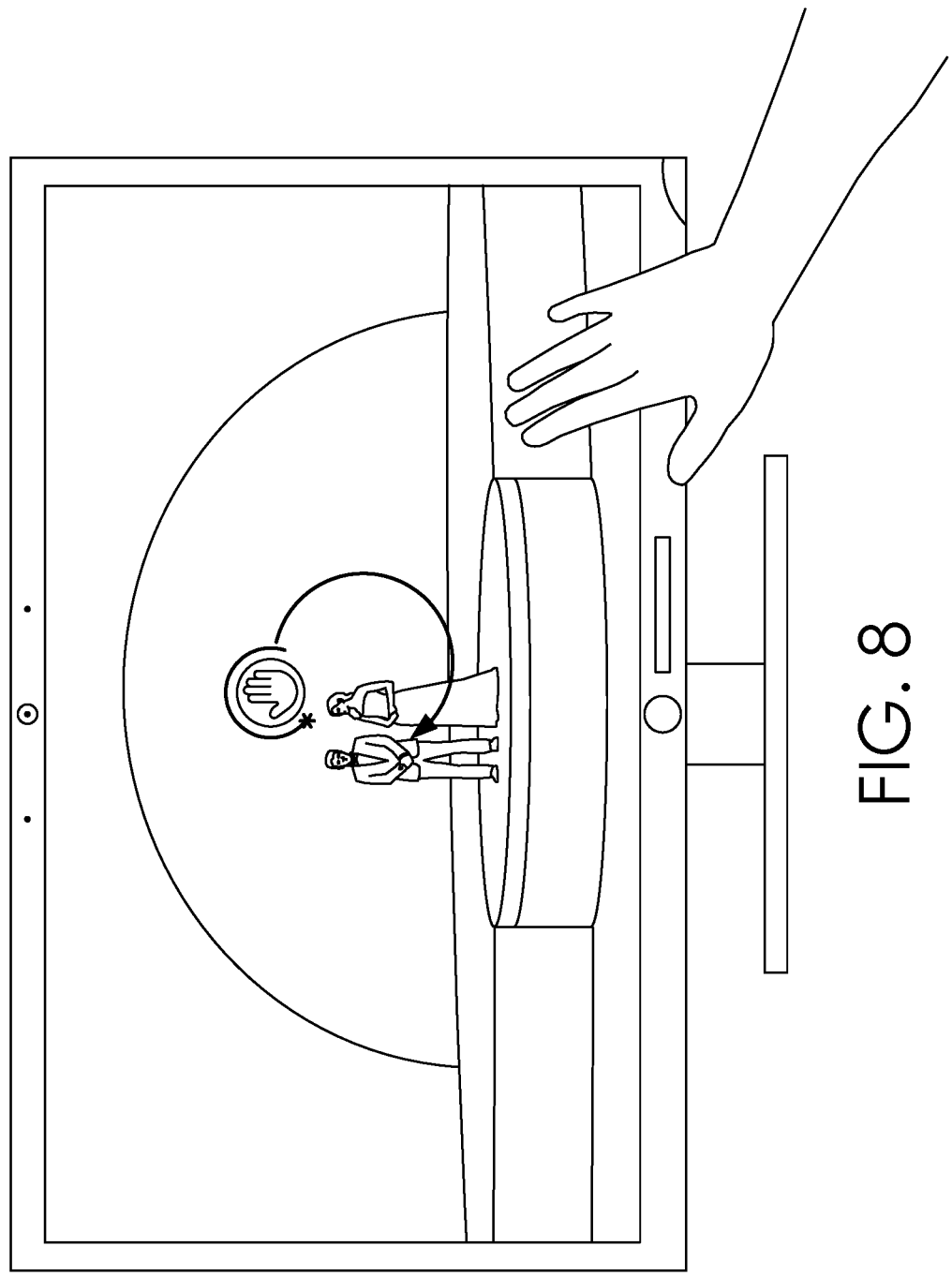
FIG. 8 is a schematic diagram that illustrates an example of an initiation of a queryless search according to an embodiment of the present invention.
Figure 9:
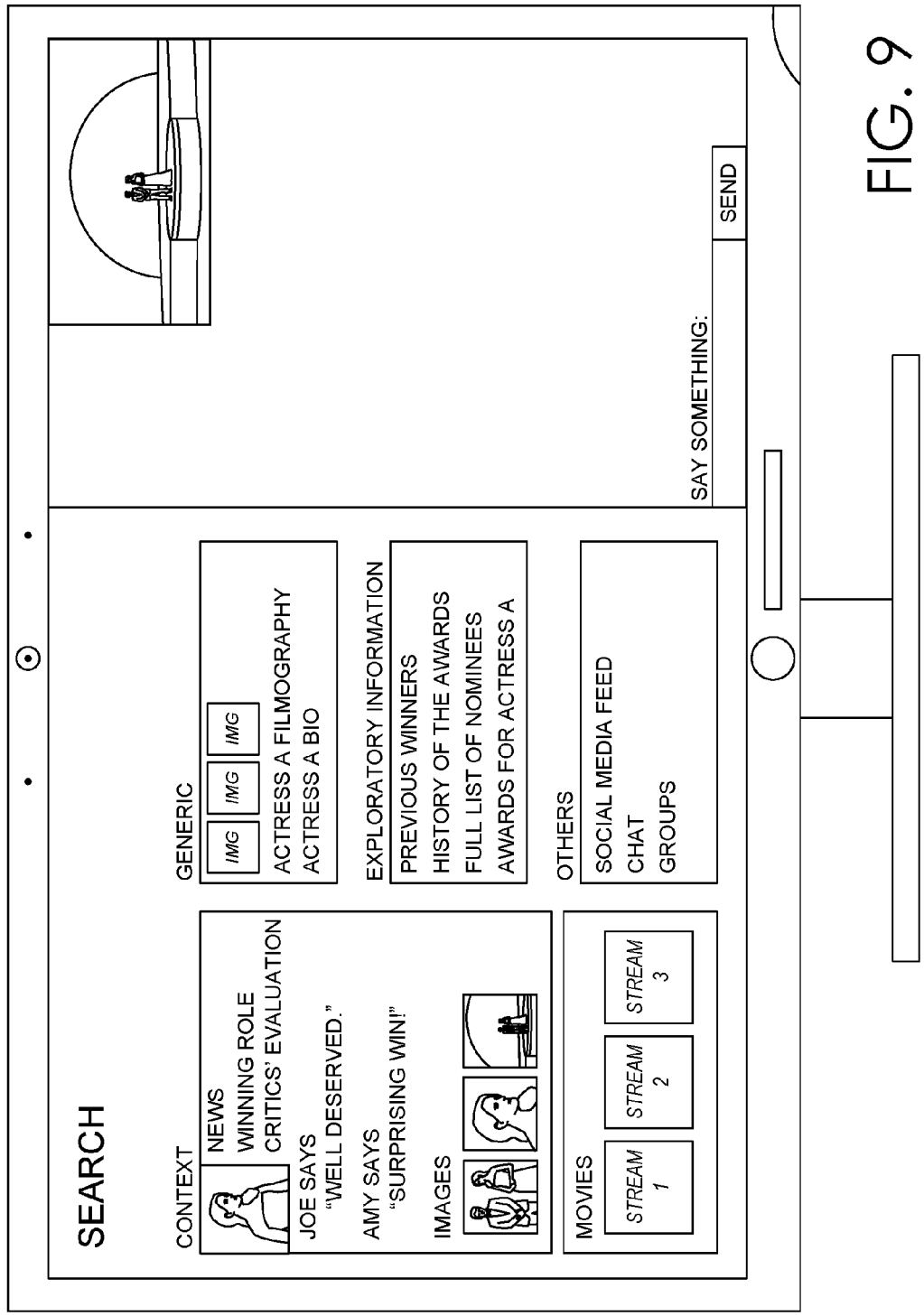
FIG. 9 is a schematic diagram that illustrates an example of search results presented based on performance of a queryless search, in accordance with an embodiment of the present invention.

FIGS. 7-9 illustrate an example of a queryless search performed in association with a television program. Initially, FIG. 7 illustrates an example in which a television program 702 is presented via a display screen 704. Such a presentation might be facilitated, for instance, via a set top box associated with the display screen 704. Assume that a user is interested in a particular individual receiving an award during an award ceremony. As such, as illustrated in FIG. 8, the user 802 provides a search indication by providing a motion, such as, substantially enclosing a particular individual 804 receiving an award. Upon recognizing such a search indication associated with the individual 804 receiving the award, capturing contextual information is automatically initiated. Contextual information may include, for instance, the television program, the television station, the time of the search indication, the time of the presentation of the television program, the channel presenting the television program, the location of the user, the user identifier, the user's profile, etc. In accordance with a search using the contextual information, or a query automatically generated in association therewith, various search results 904 can be received and presented at the user device, as illustrated in FIG. 9. Search results 904 may include, for instance, the name of the award recipient, a role for which the award was won, other's comments (e.g., critics), network contacts' comments, information about the awards program, information about other award winners, information about previous award winners, filmology information, images associated with the awards program or the award recipient, videos associated with the awards program or the award recipient, movies and/or television programs the user has access to (e.g., via NETFLIX®, AMAZON®, etc.), an option to get connected to social network feed(s), chat(s), or group(s), or the like. As illustrated in FIG. 9, in some embodiments, the search results can consume at least a majority of the display screen. For instance, the television program 902 has been reduced in size such that the search results can be prominently displayed. In other embodiments, the search results can be displayed on a smaller portion of the display screen (e.g., a side panel) or can be integrated with the television program content.

Exemplary methods for performing a queryless search are described with reference to FIGS. 10-12. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

FIG. 10 illustrates an exemplary method 1000 of initiating a queryless search based on a search indication. The method 1000 is described in the context of the example user device for ease of illustration, but is not limited to being performed using such a user device.

At block 1002, content is displayed on a display. By way of example and not limitation, content may be displayed on a display, such as display of the user device 202. The content may be displayed within an application, such as a web browser, email client, or any other application on the user device. Additionally or alternatively, content such as a video or an audio may be played by a media player of the user device. The content may include text, an image, a picture, audio content, video content, and/or the like.

At block 1004, a search indication is detected. The search indication may be a general search indication or a search indication associated with a particular item or content displayed. Such a search indication may include a touch input on a touch screen or touch pad, a body motion detected by an image capture device, a motion of a cursor controlled by a user input device, or the like.

In response to detecting the search indication, at 1006, contextual information is captured. Such contextual information can be captured using various components of the user device or other computing devices. By way of example, captured contextual information may include GPS data indicating the location of the user device; a user profile residing on the user device or remote from the user device; a webpage or application being visited or used; previous user actions on the user device; a time at which the search indication is received; a time, frame, or location of media content presented when the search indication was detected; an indication of displayed media content (e.g., indication or representation of an image or video); metadata associated with displayed content; author of a social networking post; individuals in an image, content of social networking posts, or the like.

At block 1008, the captured contextual information, or a portion thereof, is provided to a search service for performing a search using the contextual information. In this regard, a search using the contextual information may be automatically caused to be performed in response to completion of the search indication. The contextual information may be sent to a remote search service, which is separate from the user device of the user. Additionally or alternatively, the search may be performed locally in the user device.

Thereafter, at block 1010, one or more search results are received from the search service. The one or more search results may include content related to the contextual information captured in association with the search indication. The one or more search results are displayed on the display of the user device. This is illustrated at block 1012. The search results identified as relevant to the search query are automatically displayed within the display screen. As such, a search service may return one or more search results relevant to the contextual information to the user device which may then present the one or more search results to the user. As can be appreciated, search results are displayed to a user independent of a user opening a web browser and navigating to a search service. That is, a search result listing can be displayed upon detection of a search indication even though a web browser may not be open or active at the time the search indication is detected. In some cases, placement of the search results may be determined. In embodiments, the user may interact with the search results to view details associated therewith and/or refine the search results. For instance, the user may select a search result to view more data pertaining to the search result.

The search results may be displayed until a lapse of a time period and/or an occurrence of an event. By way of example and not limitation, search results may remain active or displayed on the display screen until a predetermined time period has lapsed without use of the search results (e.g., user viewing, selecting, etc.). By way of further example, a hide or collapse indication can be received, which effectively results in display of the original content without interrupting the user's workflow.

Turning now to FIG. 11, FIG. 11 illustrates an exemplary method 1100 of performing a queryless search in accordance with a search indication. The method 1100 is described in the context of the search service for ease of illustration, but is not limited to being performed thereon.

Initially, at block 1102, contextual information is received from a user device. Such contextual information may include, for example, GPS data indicating the location of the user device; a user profile residing on the user device or remote from the user device; previous user actions on the user device; a time at which the search indication is received; a time, frame, or location of media content presented when the search indication was detected; an indication of displayed media content (e.g., indication or representation of an image or video); metadata associated with displayed content; an author of a social networking post; an individual(s) in an image, content of a social networking post(s), or the like.

At block 1104, a search query is formulated based upon the received contextual information. Subsequently, at block 1106, a search is performed or initiated utilizing the generated search query to identify one or more search results. In embodiments, an Internet search may be performed using the formulated search query. Any number of searches for search results can be performed, for example, a search for web results, a search for images, a search for media, a search for advertisements, etc. The one or more search results are provided to the user device, as indicated at block 1108.

With reference to FIG. 12, FIG. 12 illustrates an exemplary method 1200 of initiating a queryless search based on a search indication received when media content is being presented. The method 1200 is described in the context of the example user device for ease of illustration, but is not limited to being performed using such a user device.

At block 1202, media content is displayed on a display. By way of example and not limitation, media content may be displayed on a display, such as display of the user device 202. The media content may be played by a media player of the user device or a television associated with a set top box or other computing device. The media content may include video and/or audio media content.

At block 1204, a search indication is detected. The search indication may be a general search indication or a search indication associated with a particular item or content displayed. Such a search indication may include, for example, a touch input on a touch screen, touch pad, or remote control; a body motion detected by an image capture device; and/or a motion of a user input device.

Upon detecting the search indication, at 1206, contextual information related to the presented media content is automatically captured. Such contextual information can be captured using or by accessing various components of the user device or other computing devices. By way of example, captured contextual information may include the location of the user; a time, frame, or position of the media content at or near the time of the search indication; an indication of displayed media content (e.g., indication or representation of an image or video); metadata associated with displayed content, or the like. Contextual information may also include personal data associated with the user or data obtained relation to another user device.

At block 1208, the captured contextual information related to the presented media content, or a portion thereof, is provided to a search service for performing a search using the contextual information. In this regard, a search using the contextual information may be automatically caused to be performed in response to completion of the search indication. The contextual information may be sent to a remote search service, which is separate the user device of the user. For example, the contextual information may be sent to a traditional Internet search engine to obtain more information about the media content presented, such as the actor, a media summary or overview, an indication of other related media, etc. Additionally or alternatively, the search may be performed locally in the user device, for example, to obtain an indication of other media that the user has local access to (e.g., related media).

Thereafter, at block 1210, one or more search results are received from the search service. The one or more search results may include content related to the contextual information captured in association with the search indication. The one or more search results are displayed on the display of the user device. This is illustrated at block 1212. The search results identified as relevant to the search query are automatically displayed within the display screen. As such, a search service may return one or more search results relevant to the contextual information to the user device which may then present the one or more search results to the user. As can be appreciated, search results are displayed to a user independent of a user opening a web browser and navigating to a search service. That is, a search result listing can be displayed upon detection of a search indication even though a web browser may not be open or active at the time the search indication is detected. In some cases, placement of the search results may be determined.

Any of the acts of any of the methods described herein may be implemented at least partially by a processor or other electronic device based on instructions stored on one or more computer-readable media.

Although the invention has been described in language specific to structural features and/or methodological acts, it is to be understood that the invention is not necessarily limited to the specific features or acts described. Rather, the specific features and acts are disclosed as exemplary forms of implementing the invention.

The invention claimed is:

1. A computer-implemented method of facilitating a queryless search by generating a combined display of presented content and contextually-related search results, the method comprising:

under control of one or more processors configured with computer-executable instructions:

detecting an action performed by a user on a user device while the presented content is being presented on the user device, wherein the action comprises
a touch input on a touch screen, touch pad, or remote control,
a motion of a user input device,
a motion of a cursor controlled by the user input device,
a selection controlled by a user input device, or
a combination thereof;

responsive to detecting the user action, automatically initiating a search utilizing contextual information presented on the user device, wherein the contextual information is associated with the action performed by the user, wherein the contextual information comprises information related to two or more of the presented content, the user, the user device, or a behavior of a third-party deemed similar to the user;

receiving one or more search results corresponding with the contextual information; and modifying the display on the user device, such that the one or more search results are presented with the presented content via the display on the user device.

2. The method of claim 1, wherein the one or more search results are overlaid on the content being presented.

3. The method of claim 1, wherein the action performed by the user corresponds to an item of interest within the presented content.

4. The method of claim 1, wherein the one or more search results comprise one or more of text, images, video content, or audio content.

5. The method of claim 1, wherein the one or more search results comprise a user selectable option.

6. The method of claim 5, wherein the user selectable option comprises an option to view content, an option to make a purchase, an option to connect to a chat, or a combination thereof.

7. One or more computer-readable hardware storage devices storing instructions that, when executed by a processor, configure the processor to perform acts that generate a combined display of presented content and contextually-related search results, comprising:
- detecting an action performed by a user on a user device, wherein the action is detected while the presented content is being presented via one or more of text or images on the user device, wherein the action performed by the user is associated with a portion of the content;
- responsive to the action performed by the user, automatically obtaining contextual information related to the presented content, wherein the contextual information comprises information related to two or more of the presented content, the user, the user device, or a behavior of a third-party deemed similar to the user;
- without receiving a search query via a search engine web page, automatically communicating the contextual information to a remote search service; and
- receiving one or more search results related to the obtained contextual information; and
- modifying a display of the presented content on the user device while the presented content is being presented, such that the modification of the display of the presented content comprises presenting the one or more search results on the user device with the presented content rather than on a search engine results page.

8. The devices of claim 7, wherein the contextual information comprises one or more of:
- text associated with the presented content;
- an identifier of the presented content;
- a time associated with the action performed by the user;
- metadata associated with the presented content;
- a time associated with presentation of the presented content; or
- a channel presenting the presented content.

9. The devices of claim 7, wherein the contextual information comprises at least user activity associated with a remote user device.

10. The devices of claim 7, wherein the one or more search results comprise a link, web results, information associated with the presented content, a selectable option, a representation of a similar or related media object, or a combination thereof.

11. The devices of claim 7, wherein the action performed by the user corresponds to an item of interest within the content being presented.

12. The devices of claim 7, wherein the one or more search results comprise a user selectable option including an option to view content, an option to make a purchase, an option to connect to a chat, or a combination thereof.

13. A user device that generates a combined display of presented content and contextually-related search results, the user device comprising:
- a processor;
- memory communicatively coupled to the processor;
- a display screen configured to display content;
- a detector component to detect an action performed by a user on the user device while the content is being presented on the user device, to determine that the action is associated with a portion of the content being presented on the user device, and to automatically initiate a search corresponding to an item of interest within the content being presented, wherein the action performed by the user does not specify a search query for use in performing the search;
- a context capturer component to automatically capture contextual information, including the item of interest, related to the content displayed on the user device in response to detecting the action performed by the user, wherein the contextual information comprises information related to two or more of the presented content, the user, the user device, or a behavior of a third-party deemed similar to the user; and
- a presentation component to cause presentation of one or more search results that correspond with the contextual information related to the content, wherein the display of the content being presented on the user device is modified such that the one or more search results are presented in association with the displayed content.

14. The user device of claim 13, wherein the action performed by the user comprises:
- a touch input on a touch screen, touch pad, or remote control,
- a motion of a user input device,
- a motion of a cursor controlled by the user input device,
- a selection controlled by the user input device, or
- a combination thereof.

15. The user device of claim 13, wherein the search is automatically initiated by providing the contextual information to a search service.

16. The user device of claim 13, wherein the one or more search results are identified based on only the contextual information.

17. The user device of claim 13, wherein a placement of the one or more search results is determined based on a predetermined location or an optimal location in accordance with the displayed content.

18. The user device of claim 13, wherein the one or more search results comprise a user selectable option.

19. The user device of claim 18, wherein the user selectable option comprises an option to view content, an option to make a purchase, an option to connect to a chat, or a combination thereof.

* * * * *